United States Patent [19]
VanLaningham et al.

[11] Patent Number: 5,370,209
[45] Date of Patent: Dec. 6, 1994

[54] ELECTROMAGNETIC COUPLING ARMATURE ASSEMBLY ADAPTABLE TO VARIOUS TYPES OF HUBS

[75] Inventors: Kalvin G. VanLaningham, Beloit; Dwight E. Booth, Janesville, both of Wis.

[73] Assignee: Dana Corporation, Toledo, Ohio

[21] Appl. No.: 119,729

[22] Filed: Sep. 10, 1993

[51] Int. Cl.⁵ ............................................. F16D 27/04
[52] U.S. Cl. .............................. 192/106.1; 192/84 C; 335/277; 403/1
[58] Field of Search .................. 192/106.1, 84 C; 335/270, 277; 403/1

[56] References Cited

U.S. PATENT DOCUMENTS

| | | | |
|---|---|---|---|
| 4,187,939 | 2/1980 | Silverstrini et al. | 192/84 C |
| 4,445,606 | 5/1984 | Van Laningham | 192/106.1 |
| 4,493,407 | 1/1985 | Newton | 192/84 C |
| 4,642,031 | 2/1987 | Farr | 192/84 C X |
| 5,036,964 | 8/1991 | Booth et al. | 192/84 C |
| 5,046,594 | 9/1991 | Kakinuma | 192/84 C |
| 5,052,534 | 10/1991 | Gustin et al. | 192/84 C X |
| 5,080,214 | 1/1992 | Fossum | 192/84 C X |
| 5,150,779 | 9/1992 | Booth | 192/106.1 |
| 5,195,625 | 3/1993 | Chang et al. | 192/84 C |
| 5,250,921 | 10/1993 | Van Laningham et al. | 192/84 C X |

FOREIGN PATENT DOCUMENTS 2-17229  1/1990  Japan ............................. 192/84 C Primary Examiner—Andrea L. Pitts
Attorney, Agent, or Firm—Leydig, Voit & Mayer

[57] ABSTRACT

An electromagnetic armature assembly includes a spider made of resiliently yieldable plastic and carrying an annular armature plate. A mounting disc is insert molded into the spider and is adapted to be assembled with a tubular hub mountable on a rotatable shaft. The mounting disc enables the armature assembly to be mounted on various types of hubs, either with no change to the armature assembly or with very little change.

7 Claims, 2 Drawing Sheets

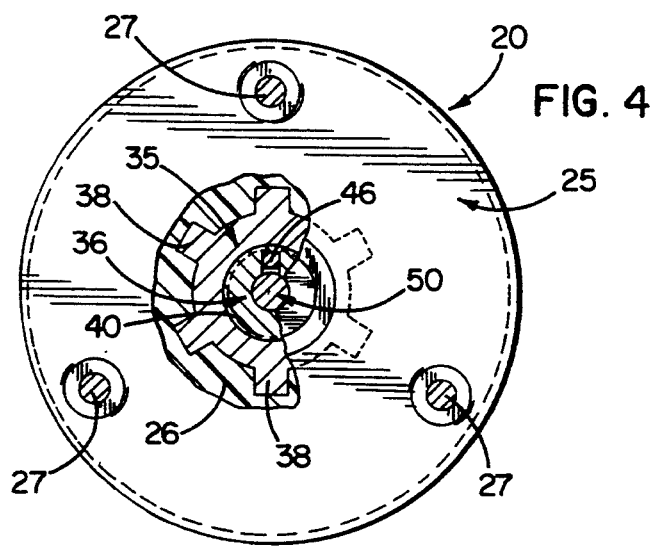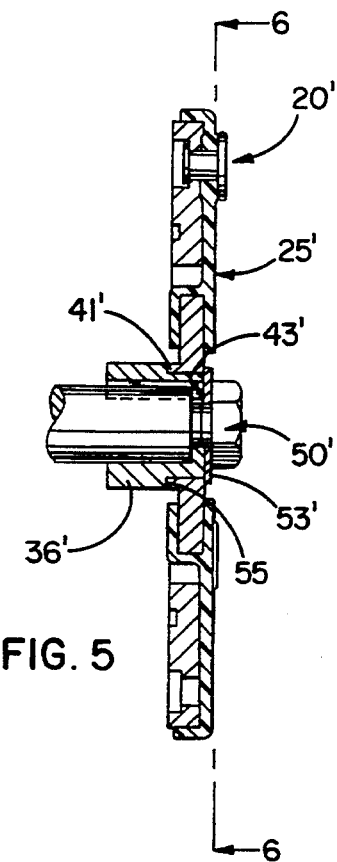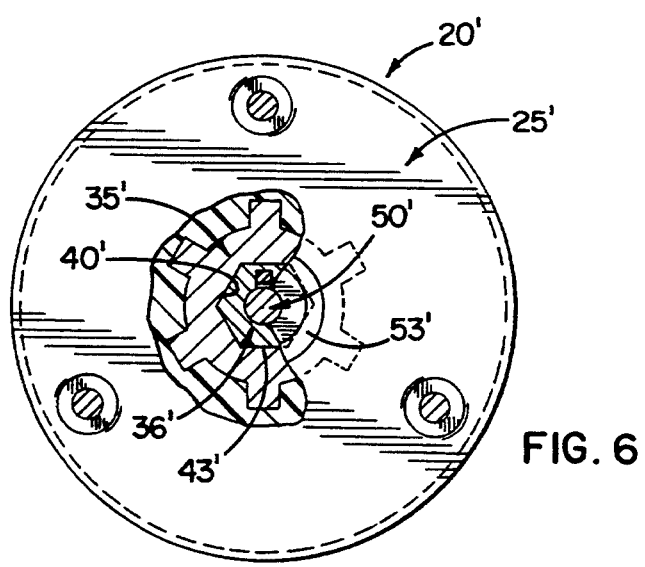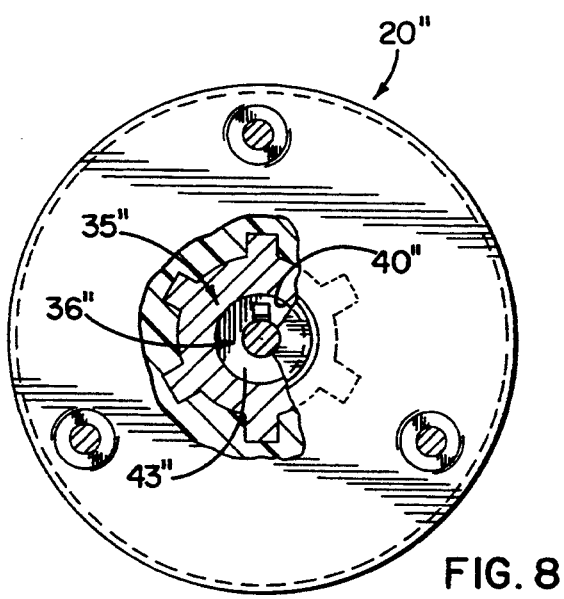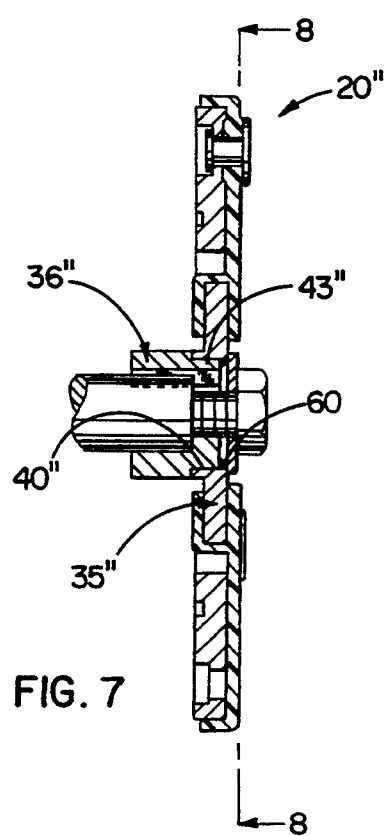

ELECTROMAGNETIC COUPLING ARMATURE ASSEMBLY ADAPTABLE TO VARIOUS TYPES OF HUBS

BACKGROUND OF THE INVENTION

This invention relates generally to an electromagnetic coupling such as a clutch or brake and, more particularly, to an armature assembly for such a coupling.

Booth et al., U.S. Pat. No. 5,036,964 and Booth, U.S. Pat. No. 5,150,779 each disclose an electromagnetic clutch in which an armature is connected to a driven hub on a rotatable shaft and is adapted to be frictionally coupled to a driving rotor when an electromagnet is energized to engage the clutch. When the clutch is engaged, the rotor acts through the armature to rotate the driven hub and the shaft.

The armature assembly disclosed in each of the aforementioned patents includes a resilient plastic spider with a web which acts to connect a low magnetic reluctance armature plate for rotation with the driven hub. The web flexes axially in order to permit the armature plate to move toward and away from the rotor when the clutch is engaged and disengaged. The hub is insert molded in place when the spider is molded and thus the plastic of the spider is bonded to and encapsulates part of the hub in order to join the hub to the spider.

Clutches are used with different types of shafts which require different types of armature hubs. As a result, it has been necessary in the past to customize various armature assemblies having different types of hubs molded in place in the spider. A substantial tooling investment is required to achieve this and, in addition, several different types of customized armature assemblies must be maintained in inventory.

SUMMARY OF THE INVENTION

The general aim of the present invention is to provide a new and improved armature assembly of the foregoing general character which is more universally adaptable to different types of hubs and shafts so as to reduce the cost of both producing and inventorying armature assemblies.

A more detailed object of the invention is to achieve the foregoing by standardizing the resiliently yieldable spider of the armature assembly and by insert molding a relatively simple mounting disc in the spider, the mounting disc being adapted for assembly with a separately formed hub. The external configuration of mounting discs for various types of hubs is identical and thus substantially common tooling may be used to effect insert molding of the mounting discs.

These and other objects and advantages of the invention will become more apparent from the following detailed description when taken in conjunction with the accompanying drawings.

BRIEF DESCRIPTION OF THE DRAWINGS

FIG. 4 is a cross-section, on a reduced scale, taken substantially along the line 4—4 of FIG. 2.

FIG. 5 is a view generally similar to FIG. 2 but shows a modified hub and armature assembly.

FIG. 6 is a cross-section, on a reduced scale, taken substantially along the line 6—6 of FIG. 5.

FIG. 7 is another view generally similar to FIG. 2 but shows still another modified hub and armature assembly.

FIG. 8 is a cross-section, on a reduced scale, taken substantially along the line 8—8 of FIG. 7.

Figure 1:
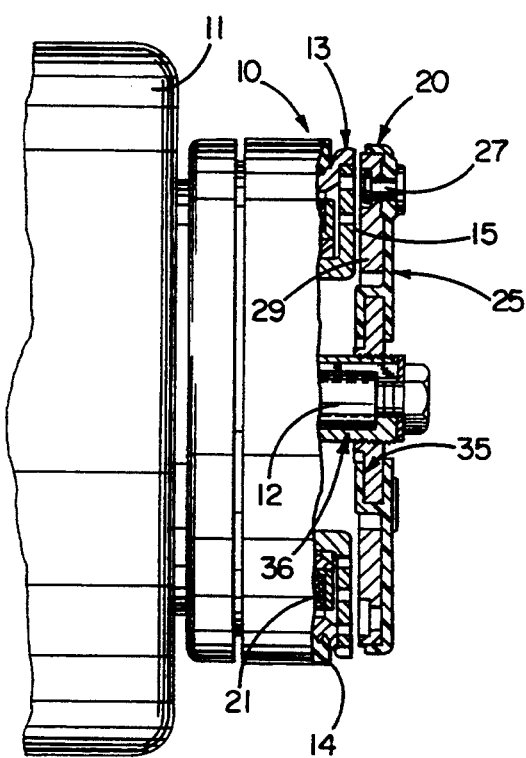
FIG. 1 is a side elevational view of a typical electromagnetic coupling equipped with a new and improved armature assembly incorporating the unique features of the present invention, certain parts of the coupling being broken away and shown in section.
Figure 2:
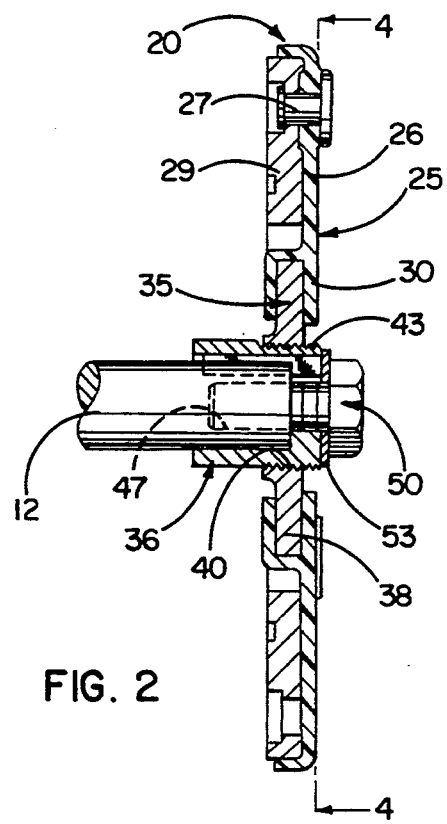
FIG. 2 is an enlarged view of the shaft, hub and armature assembly shown in FIG. 1.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the present invention has been shown in the drawings in connection with an electromagnetic coupling 10 which could be a brake but which herein is in the form of an electromagnetic clutch. The clutch 10 is shown as being used in conjunction with a vehicular air conditioning compressor 11 having a rotatable drive shaft 12.

The clutch 10 includes an electromagnet which is formed in part by a rotor 13 coaxial with the shaft 12 and adapted to be driven by an endless belt 14. Located in opposing relation with a face 15 of the rotor is an armature assembly 20. When a winding 21 is excited, magnetic flux draws part of the armature assembly into frictional engagement with the rotor face 15 so as to couple the armature assembly and the rotor for rotation in unison. Rotation of the armature assembly is transmitted to the shaft 12 in order to drive the compressor 11.

In some respects, the armature assembly 20 is similar to that disclosed in Booth U.S. Pat. No. 5,150,779, the disclosure of which is incorporated herein by reference. Thus, the armature assembly includes a spider 25 which is injection molded of resiliently yieldable material such as plastic. A suitable material for the spider is Dupont Zytel ST 801-HS.

The spider 25 includes a web 26 which is preferably circular and which is comparatively thin in the axial direction so that the web is capable of flexing axially. Connected by angularly spaced rivets 27 to the outer peripheral portion of the web is an annular disc or plate 29 which forms the actual armature of the armature assembly 20. The plate 29 is made of low magnetic reluctance material such as AISI 1010 steel and is normally spaced axially from the rotor face 15 as shown in FIG. 1. When the coil 21 is excited, the web 26 flexes to allow the armature plate to be drawn axially into coupling engagement with the rotor face.

Figure 3:
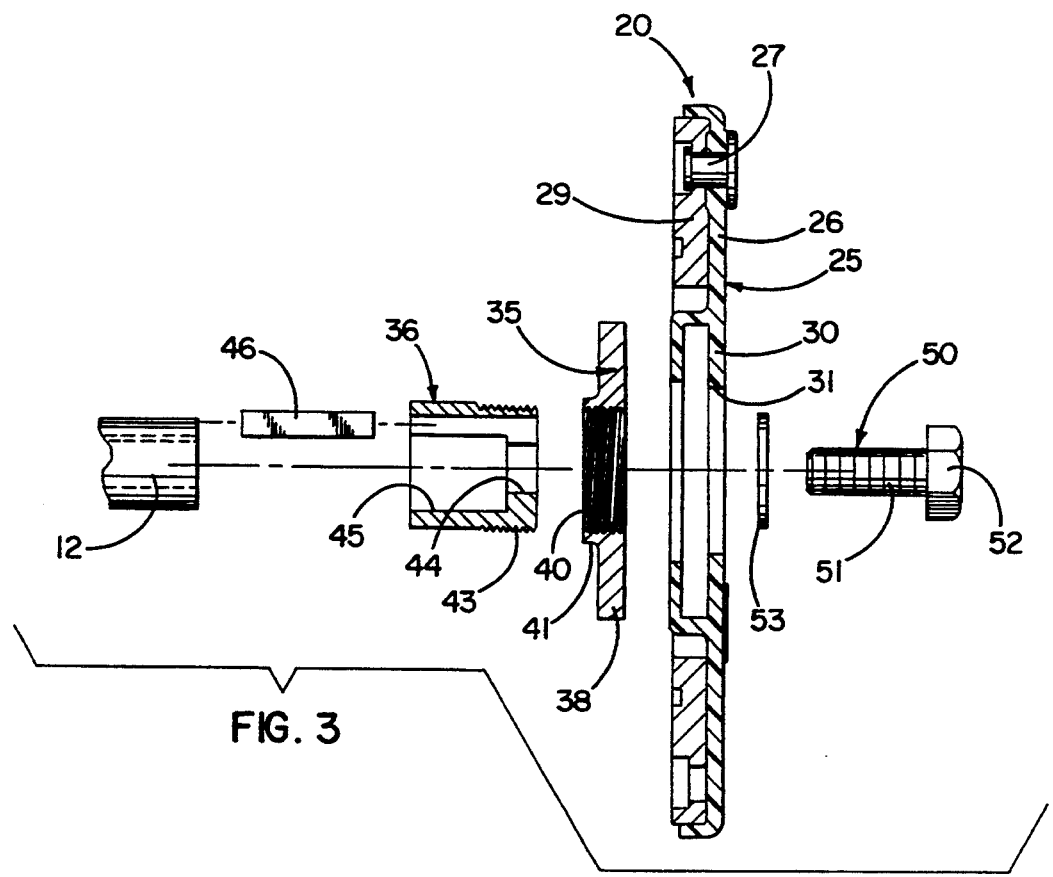
FIG. 3 is an exploded view of the components shown in FIG. 2.

Molded integrally with the inner peripheral portion of the web 26 is an annular mounting sleeve 30 having a centrally located and axially extending hole 31 (FIG. 3) therein. The relatively thin web 26 is capable of flexing axially relative to the sleeve 30.

In accordance with the present invention, a relatively simple mounting disc 35 is joined intimately to the sleeve 30 of the spider 25. The mounting disc is adapted to be secured to a tubular hub 36 which, in turn, is coupled to the compressor shaft 12. As will become apparent subsequently, the use of the mounting disc 35 and the separately formed hub 36 allows for more economical manufacture of armature assemblies 20 useable with different types of hubs and shafts and reduces the number of types of armature assemblies which must be made and inventoried in order to accommodate various types of hub and shaft configurations.

In the embodiment of the invention shown in FIGS. 1–4, the mounting disc 35 is preferably but not necessarily made of powdered metal. The disc is comparatively thin in the axial direction and its outer periphery is formed with a series of angularly spaced and radially projecting lugs 38 (FIG. 4) which are separated by intervening spaces. The disc is insert molded in place when the spider 25 is molded and, during the molding operation, plastic of the sleeve 30 flows into and fills the spaces between the lugs. When the plastic cures, it encapsulates and becomes bonded intimately to the outer peripheral portion of the disc 35 and its angularly spaced lugs 36. By virtue of being bonded to the lugs and filling the spaces therebetween, the plastic couples the spider and the disc for rotation in unison.

Formed through the central portion of the disc 35 is an axially extending hole 40 (FIG. 3), there being an axially short collar 41 formed integrally with the rear side of the disc adjacent the hole. The hole 40 is internally threaded.

In carrying out the invention, the hub 36 is formed separately of the mounting disc 35 and also may be made of powdered metal. The hub is in the form of a relatively long sleeve whose forward end portion or nose 43 is externally threaded. A comparatively small diameter hole 44 (FIG. 3) is formed in the forward end portion of the hub while a larger counterbore 45 is formed in the rear end portion of the hub and is sized to telescopically receive the shaft 12. A key 46 is adapted to fit in keyways formed in the hub and the shaft in order to couple the hub for rotation with the shaft. A threaded bore 47 (FIG. 2) is formed in the shaft and opens axially out of the free end thereof.

With the foregoing arrangement, the spider 25 with the molded in place mounting disc 35 may be assembled to the hub 36 by screwing the disc tightly onto the externally threaded nose 43 of the hub. Thereafter, the hub may be telescoped onto the shaft 12 and coupled for rotation therewith by the key 46. To captivate the components axially, there is provided a screw 50 having a threaded shank 51 and a head 52, the shank being sized to slip through a washer 53. The shank 51 of the screw is extended through the hole 44 and the counterbore 45 in the hub 36 and is threaded into the bore 47 in the shaft 12. When the screw is tightened, its head 52 presses the washer 53 against the end of the nose 43 of the hub in order to clamp the bottom of the counterbore against the end of the shaft and thereby captivate the armature assembly on the shaft.

The advantages of the invention become more readily apparent from the embodiment of the armature assembly 20' shown in FIGS. 5 and 6 in which parts corresponding to those of the first embodiment have been indicated by the same but primed reference numerals. The hub 36' is somewhat shorter than the hub 36 and, rather than having an externally threaded nose 43, is formed with a hexagonally-shaped nose 43', there being an annular shoulder 55 (FIG. 5) at the rear end of the nose. In order to accommodate the shape of the nose 43', the disc 35' is formed with a central hole 40' (FIG. 6) which also is shaped as a hex. Thus, the disc is prevented from rotating relative to the hub when the disc is telescoped onto the hub. When the screw 50' is tightened, the washer 53' engages the forward face of the disc 35' and clamps the collar 41' of the disc against the shoulder 55 of the hub in order to captivate the disc axially on the hub.

The only differences between the spider 25' and the disc 35' of the second embodiment and the spider 25 and disc 35 of the first embodiment is that the disc 35' is formed with a hexagonally-shaped hole 40' rather than a threaded hole 40. As a result, only minor conversions need be made to the molding tooling in order to effect insert molding of either the disc 35 or the disc 35'.

In some clutches, either the hub 36 or the hub 36' may be formed with an internally tapered bore so as to mate with a tapered compressor shaft. The discs 35 and 35' may be used universally with either tapered or non-tapered hubs and also may be used universally with internally splined hubs or smooth bored hubs.

Still another embodiment of an armature assembly 20'' is shown in FIGS. 7 and 8. In this instance, the hub 36'' is formed with a cylindrical nose 43'' and thus the disc 35'' is formed with a complementary cylindrical hole 40''. Rotation of the disc 35'' relative to the hub 36'' is prevented by a circumferentially continuous laser weld 60 (FIG. 8) which joins the outer end of the nose 43'' to the edge of the hole 40''. Again, only minor changes to the basic molding tooling need be made to effect insert molding of the disc 35''.

From the foregoing, it will be apparent that the exterior shapes of the mounting discs 35, 35' and 35'' are identical and that the plastic spiders 25, 25' and 25'' are identical. By merely changing the shape and/or construction of the central hole in the disc, armature assemblies may be produced to fit various types of hubs. As a result, common tooling may be used for molding the spider while only minor modifications need be made to the tooling to accommodate the different hole configuration. A common disc may be used with hubs having noses with similar external shapes regardless of whether the internal bore of the hub is straight, tapered, smooth or splined. Thus, separate formation of the disc and the hub enables the exact same armature assembly to be used with hubs of different internal configurations and significantly reduces inventory requirements.

We claim:

1. An armature assembly for use with an electromagnetic coupling having a rotatable shaft, said armature assembly comprising a generally circular spider having a torque transmitting web made of resiliently yieldable plastic, said web having an outer peripheral portion and having a centrally located hole extending axially therethrough, an annular armature plate of low magnetic reluctance material secured to the outer peripheral portion of said web, a mounting disc located in said hole and joined intimately to said web, said disc having a centrally located hole extending axially therethrough, a tubular hub formed separately of said disc and inserted through said hole in said disc, said hub being sized and shaped to telescope over a shaft, first means for preventing said disc from moving relative to said hub, and second means for preventing said hub from moving relative to said shaft.

2. An armature assembly as defined in claim 1 in which said first means comprises an internal thread in the hole of said disc and further comprises an external thread on said hub threadably engaged with said internal thread.

3. An armature assembly as defined in claim 1 in which said hole in said disc includes an edge, said first means being defined in part by the edge of said hole, said edge being non-circular in shape, said first means also being defined in part by a non-circular peripheral surface of said hub and engageable with said edge to prevent rotation of said disc on said hub.

4. An armature assembly as defined in claim 1 in which said first means is defined at least in part by weld means between said disc and said hub.

5. An armature assembly as defined in claim 1 in which said second means comprises a key located between said hub and said shaft, said key preventing said hub from rotating on said shaft.

6. An armature assembly as defined in claim 5 in which said second means further comprises a screw adapted to be threaded axially into said shaft to captivate said hub axially on said shaft.

7. An armature assembly for use with an electromagnetic coupling having a rotatable shaft, said armature assembly comprising a generally circular spider having a torque transmitting web made of resiliently yieldable plastic material, said web having inner and outer peripheral portions, an annular armature plate of low magnetic reluctance material secured to the outer peripheral portion of said web, a sleeve integral with the inner peripheral portion of said web, there being a centrally located hole formed through said sleeve, a mounting disc having an outer peripheral portion defined by a series of angularly spaced lugs and intervening spaces, said disc being disposed in said hole with the outer peripheral portion of said disc being disposed in said sleeve and with said spaces being filled with said plastic material, said plastic material being bonded intimately to said lugs to join said web to said disc, said disc having a centrally located hole extending axially therethrough, a tubular hub formed separately of said disc and inserted through said hole in said disc, a hub being sized and shaped to telescope over said shaft, first means for preventing said disc from moving relative to said hub, and second means for preventing said hub from moving relative to said shaft.

* * * * *